(12) United States Patent
LeBlanc et al.

(10) Patent No.: US 6,489,927 B2
(45) Date of Patent: Dec. 3, 2002

(54) SYSTEM AND TECHNIQUE FOR MOUNTING A RADAR SYSTEM ON A VEHICLE

(75) Inventors: Stephen P. LeBlanc, Stratham, NH (US); Joseph S. Pleva, Londonderry, NH (US); Walter Gordon Woodington, Lincoln, MA (US); Michael Joseph Delcheccolo, Westford, MA (US); Mark E. Russell, Westford, MA (US); H. Barteld Van Rees, Needham, MA (US); Caroline Breglia, Methuen, MA (US); Richard P. Donovan, Windham, NH (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/930,868

(22) Filed: Aug. 16, 2001

(65) Prior Publication Data

US 2002/0067305 A1 Jun. 6, 2002

Related U.S. Application Data

(60) Provisional application No. 60/226,160, filed on Aug. 16, 2000.

(51) Int. Cl.$^7$ .................................................. H01Q 1/32
(52) U.S. Cl. ........................... 343/713; 342/25; 342/70; 342/71; 342/72; 342/198; 343/711; 343/712
(58) Field of Search .............................. 342/25, 70, 71, 342/72, 198; 343/711, 712, 113

(56) References Cited

U.S. PATENT DOCUMENTS

| | | |
|---|---|---|
| 4,063,243 A | 12/1977 | Anderson et al. |
| 4,209,791 A | 6/1980 | Gerst et al. |
| 4,246,585 A | 1/1981 | Mailloux |
| 4,414,550 A | 11/1983 | Tresselt |

(List continued on next page.)

FOREIGN PATENT DOCUMENTS

| | | |
|---|---|---|
| DE | 198 55 400 | 12/1998 |
| DE | 198 50 128 | 5/1999 |
| EP | 0 398 712 | 5/1990 |
| EP | 0 484 995 | 5/1992 |
| EP | 0 642 190 A1 | 12/1993 |
| EP | 0 784 213 | 1/1996 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |

OTHER PUBLICATIONS

International Search Report of PCT Application No. PCT/US01/25676 dated Dec. 21, 2001.
International Search Report of PCT Application No. PCT/US01/42065 dated May 14, 2002.
International Search Report of PCT Application No. PCT/US01/25594 dated May 7, 2002.
G.S. Dow, et al. "Monolithic Receivers with Integrated Temperature Compensation Funtion", IEEE GaAs IC Symposium, 1991, pp. 267–269.

(List continued on next page.)

Primary Examiner—Thomas H. Tarcza
Assistant Examiner—Isam Alsomiri
(74) Attorney, Agent, or Firm—Daly, Crowley & Mofford, LLP (57) ABSTRACT

A system and technique for mounting a radar to a vehicle provides a mounting that does not interfere with the aesthetic appearance of a vehicle, that does not interfere with the aerodynamic performance of the vehicle, and offers optimal radar transmission efficiency. The vehicle can be an automobile or any other vehicle to which a radar system is applied.

10 Claims, 5 Drawing Sheets

U.S. PATENT DOCUMENTS

| | | | |
|---|---|---|---|
| 4,507,662 A | | 3/1985 | Rothenberg et al. |
| 4,962,383 A | | 10/1990 | Tresselt |
| 5,008,678 A | * | 4/1991 | Herman .......................... 342/1 |
| 5,249,157 A | | 9/1993 | Taylor |
| 5,325,096 A | | 6/1994 | Pakett |
| RE34,773 E | | 11/1994 | Dombrowski |
| 5,394,292 A | | 2/1995 | Hayashida |
| 5,396,252 A | | 3/1995 | Kelly |
| 5,410,745 A | | 4/1995 | Friesen et al. |
| 5,451,960 A | | 9/1995 | Kastella et al. |
| 5,479,173 A | | 12/1995 | Yoshioka et al. |
| 5,517,196 A | | 5/1996 | Pakett et al. |
| 5,517,197 A | | 5/1996 | Algeo et al. |
| 5,530,447 A | | 6/1996 | Henderson et al. |
| 5,613,039 A | | 3/1997 | Wang et al. |
| 5,619,208 A | | 4/1997 | Tamatsu et al. |
| 5,625,362 A | | 4/1997 | Richardson |
| 5,627,510 A | | 5/1997 | Yuan |
| 5,633,642 A | | 5/1997 | Hoss et al. |
| 5,675,345 A | | 10/1997 | Pozgay et al. |
| 5,689,264 A | | 11/1997 | Ishikawa et al. |
| 5,757,307 A | | 5/1998 | Nakatani et al. |
| 5,926,126 A | | 7/1999 | Engelman |
| 5,929,802 A | | 7/1999 | Russell et al. |
| 5,959,570 A | | 9/1999 | Russell |
| 5,978,736 A | * | 11/1999 | Greendale ................... 343/775 |
| 5,999,092 A | * | 12/1999 | Smith et al. ................... 342/1 |
| 5,999,119 A | | 12/1999 | Carnes et al. |
| 5,999,874 A | | 12/1999 | Winner et al. |
| 6,011,507 A | | 1/2000 | Curran et al. |
| 6,026,347 A | | 2/2000 | Schuster |
| 6,026,353 A | * | 2/2000 | Winner ........................ 342/70 |
| 6,037,860 A | | 3/2000 | Zander et al. |
| 6,069,581 A | | 5/2000 | Bell et al. |
| 6,087,975 A | * | 7/2000 | Sugimoto et al. ........... 340/903 |
| 6,091,355 A | | 7/2000 | Cadotte, Jr. et al. |
| 6,097,931 A | | 8/2000 | Weiss et al. |
| 6,107,956 A | | 8/2000 | Russell et al. |
| 6,104,336 A | | 9/2000 | Curran et al. |
| 6,114,985 A | | 9/2000 | Russell et al. |
| 6,130,607 A | | 10/2000 | McClanahan et al. |
| 6,198,434 B1 | | 3/2001 | Martek et al. |
| 6,252,560 B1 | | 6/2001 | Tanaka et al. |
| 6,317,090 B1 | * | 11/2001 | Nagy et al. .................... 342/1 |

OTHER PUBLICATIONS

International Search Report of PCT Application No. PCT/US01/25682 dated May 14, 2002.

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum,et al. "Analysis of Srripline–Fed Slot–Coupled Patch Antennas with Vias for Parallel–Plate Mode Suppression", IEEE Transcations on Antennas and Propagation, vol. 46, No. 4, Apr. 1998, pp. 538–545.

Clouston E.N. et al. "A Triplate Stripline Slot Antenna Developed for Time–Domail Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectic Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Sripline/Slot Transition", Electronics Letter, vol. 26 No. 15, pp. 1160–1161.

Sakaibara, Kunio et al. "A Single Slotted Waveguide Array for 22GHz Band Radio System Between Mobile Base Station", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–426.

* cited by examiner

SYSTEM AND TECHNIQUE FOR MOUNTING A RADAR SYSTEM ON A VEHICLE

RELATED APPLICATIONS

This application claims the benefit of U.S. Provisional Application No. 60/226,160, filed on Aug. 16, 2000 which application is hereby incorporated herein by reference in its entirety.

GOVERNMENT RIGHTS

Not Applicable.

FIELD OF THE INVENTION

This invention relates generally to a system for mounting a radar system and more particularly to a system for mounting a radar system to a vehicle in a location behind a bumper section or other vehicle body part, for example, a lamp housing, a body panel, a license plate, or a side mirror housing.

BACKGROUND OF THE INVENTION

As is known in the art, radar systems have been developed for various applications in association with automobiles and other vehicles. For example, radar systems have been proposed and built that detect the presence of objects in proximity to an automobile on which the radar is mounted.

The radar system is typically optimized in shape and materials for the transmission and reception of radar energy and is not well suited to match the appearance of the body of the automobile. Thus, when mounted on the outer surface of the body of a vehicle, such as an automobile for example, a radar system is generally not aesthetically appealing.

Furthermore, automobile manufacturers, with a desire to optimize fuel efficiency, provide automobile shapes that are generally aerodynamically efficient. The radar system is not typically aerodynamically efficient when mounted to the body of an automobile since the shape of the radar system is typically optimized for effective transmission and reception of radar energy and not generally optimized for low drag.

It would, therefore, be desirable to provide a system for mounting a radar system on a vehicle that allows the vehicle on which the radar system is mounted to maintain its aesthetically pleasing shape. It would also be desirable to provide a system for mounting a radar system on a vehicle which results in the mounted radar system introducing little or no additional aerodynamic drag on the vehicle and which still allows the radar system to efficiently transmit and receive of radar energy.

It has, therefore, been recognized that it would be desirable to place the radar system behind a bumper section or other existing feature of the automobile.

SUMMARY OF THE INVENTION

In accordance with the present invention, a mounting system for mounting a radar system to a vehicle includes a spacer section between the radar system and a surface of the vehicle structure. The spacer section provides transmission thickness and an angular transmission thickness associated with the vehicle structure that increases the transmission efficiency of the radar energy from the radar system through the vehicle structure. The transmission thickness, or alternatively the angular transmission thickness, are made to be one half wavelength or a multiple thereof.

The mounting system for radar is adaptable to an automobile or to any vehicle upon which a radar system is mounted.

With this particular arrangement, a radar mounting system is provided that does not detract from the aesthetic appearance of the vehicle, and that does not detract from the drag characteristics of the vehicle. The radar mounting system for vehicles still provides efficient transmission and reception of radar energy.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
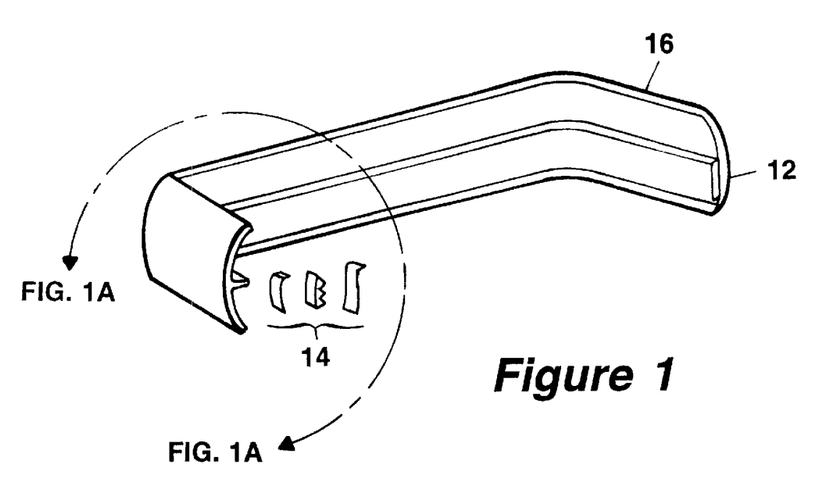
FIG. 1 is a partially exploded view of a radar system mounted to a vehicle bumper section.
Figure 1A:
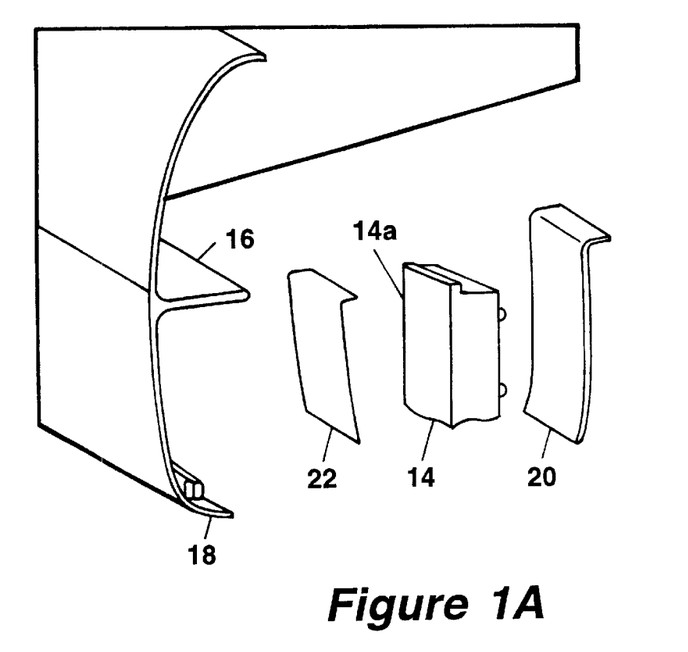
FIG. 1A is an exploded isometric view of a radar system mounted to a vehicle bumper section.

Referring to FIGS. 1 and 1A, in which like elements are provided having like reference designations, a pair of radar systems 12, 14 are mounted behind a rear automobile bumper 16. The radar systems 14, 16 may be provided, for example, as radar systems described in U.S. patent application entitled Radar Transmitter Circuitry and Techniques, filed on Aug. 16, 2001, and assigned application Ser. No. 09/931,636, and U.S. patent application entitled Highly Integrated Single Substrate MMW Multi-Beam Sensor, filed on Aug. 16, 2001, and assigned application Ser. No. 09/931,277, each of which are assigned to the assignee of the present invention and incorporated herein by reference. It should be appreciated of course that other radar systems can be used in accordance with the present invention. It should also be appreciated that this invention applies equally well for mounting radar systems 12, 14 at various locations on an automobile, and is not limited to mounting in association with the rear bumper 16, as will be described below.

The radar systems 12, 14 are each mounted behind a bumper section 16 provided from a material which allows radar signal energy to pass through with relatively little attenuation. The radar system 14 can be mounted to a mounting bracket 20 or can be mounted directly to the body of the automobile. A protective barrier section 22 is disposed between an inner wall of the bumper section 18 and a surface 14A of the radar system 14. Protective barrier section 22 provides additional protection for the radar system.

Figure 2:
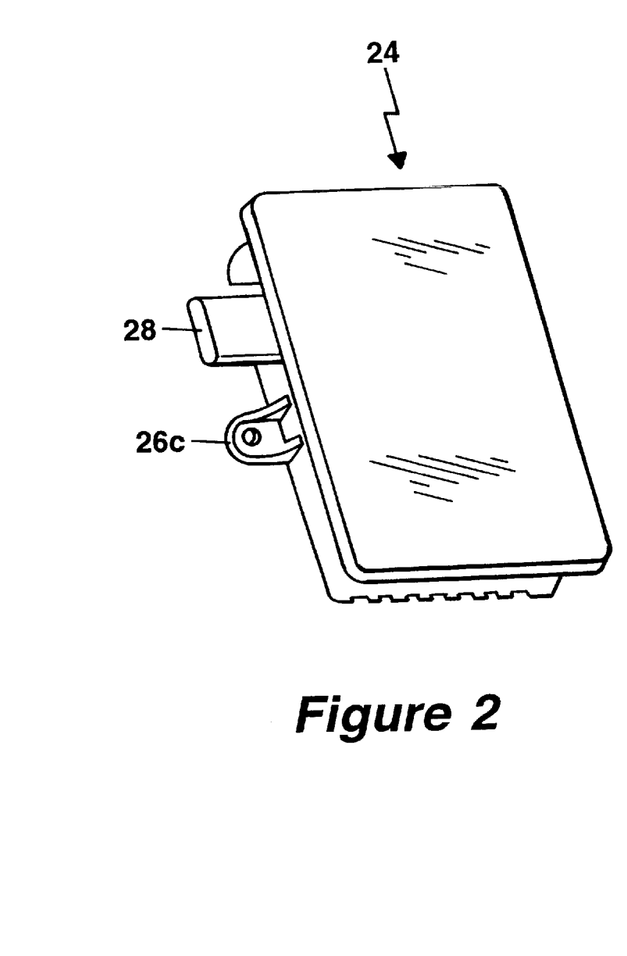
FIG. 2 is a top isometric view of a radar system adapted for mounting to a vehicle.
Figure 2A:
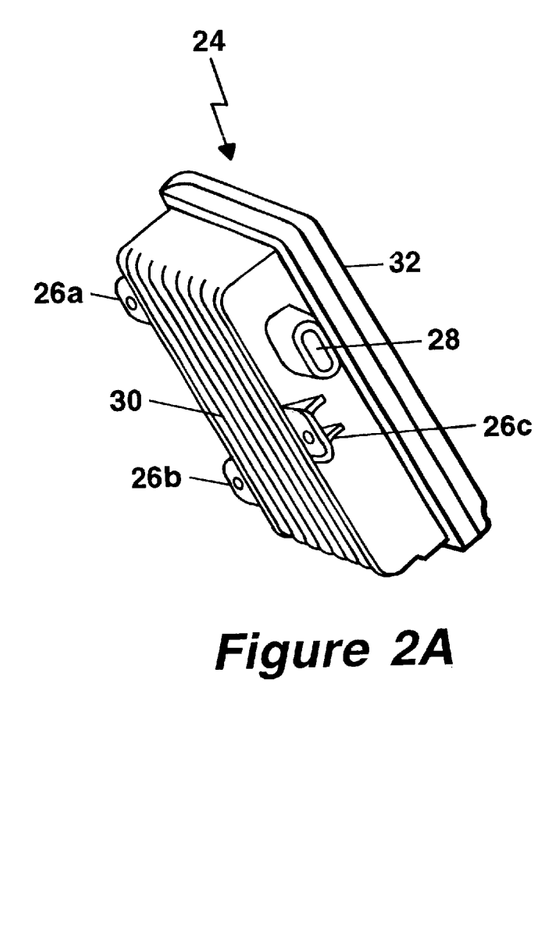
FIG. 2A is a bottom isometric view of the radar system of FIG. 2.

Referring to FIGS. 2 and 2A, in which like elements are provided having like reference designations, an exemplary radar system 24 includes mounting flanges 26a–26c that provide a mounting structure which can be used to mount the radar system to a portion of an automobile. A connector 28 provides an electrical interface both for power to the radar system and for communication of signals to and from the radar system. The radar system has a first surface 30 that faces toward the body of the automobile when the radar system 24 is disposed on the automobile. A second surface 32 of the radar system 24 faces away from the body of the automobile. In accordance with the mounting system of the present invention, the second surface 32 is directed toward an inner surface of the automobile bumper section or the inner surface of some other automobile structure. The second surface 32 is the surface through which radar signals are emitted from the radar system 24.

An exemplary radar system 24 is provided having a length of 12.7 cm, a width of 7.6 cm and a thickness of 3.8 cm where the thickness corresponds to the distance between the two surfaces 30, 32. It will be recognized by one of ordinary skill in the art that radar systems with other dimensions can be used with this invention. It will be further recognized that other mounting structures and techniques in addition to the flanges 26a–26c are possible with this invention. For example, other mounting structures include clips, snap features, adhesive, tape, and hook and loop (Velcro™).

It will be further recognized by one of ordinary skill in the art that other techniques in addition to the connector 28 can be used to provide power and data signals to the radar system. For example, a wiring harness can be molded into the radar system 24, or terminal pins can be used. It will be further recognized by one of ordinary skill that the radar system 24 can be oriented in any azimuth orientation relative to the automobile.

Figure 3:
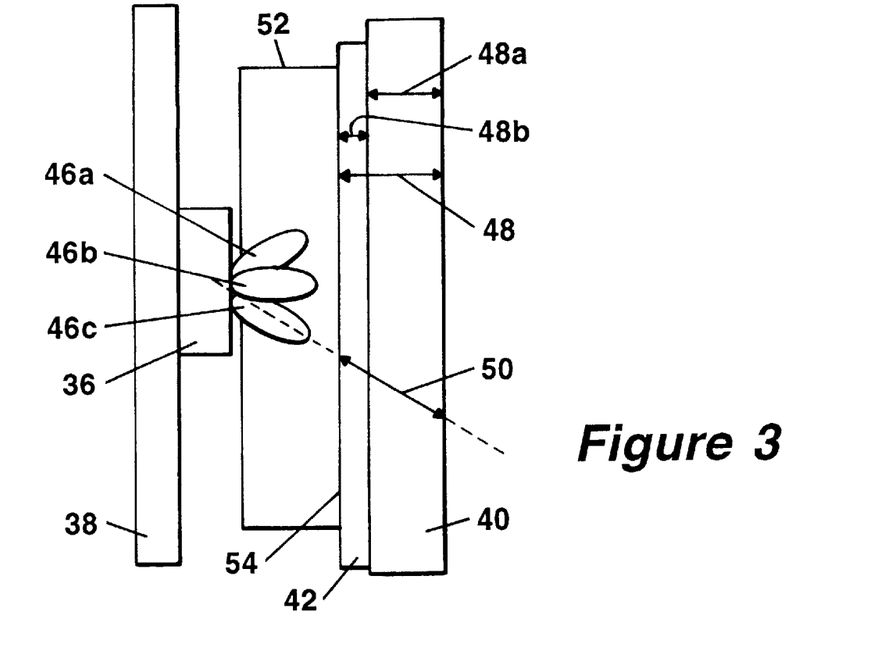
FIG. 3 is a top view of a radar system coupled to a bumper section of a vehicle.
Figure 3A:
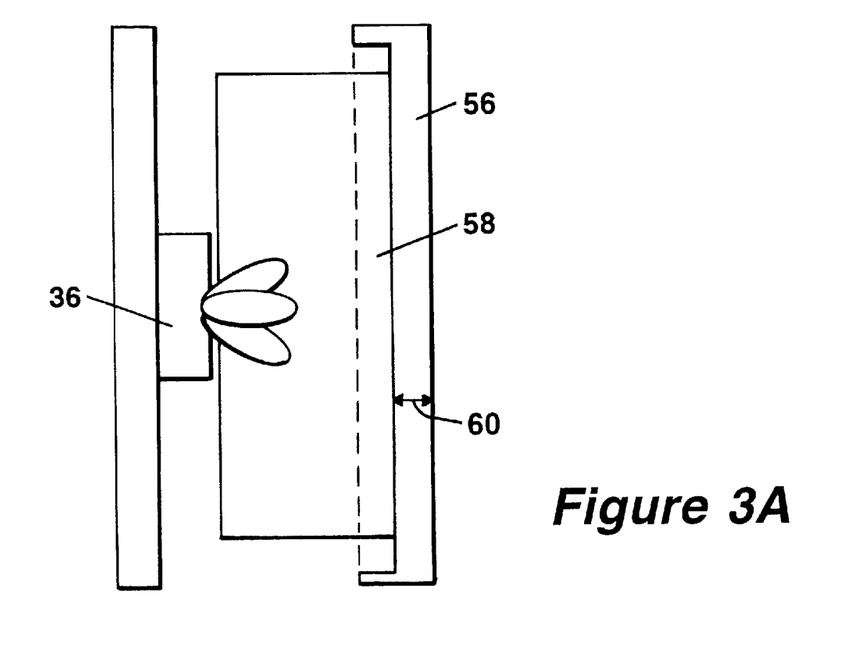
FIG. 3A is a top view of an alternate embodiment of the radar system coupled to the bumper section of a vehicle.

Referring now to FIGS. 3 and 3A shown from top view, in which like elements are provided having like reference designations, a radar system 36 is disposed on a first surface of an automobile 38. In this embodiment, radar system 36 is coupled to an outer surface of the body of the automobile 38. The radar system 36 has disposed thereover an optional protective barrier section 52. The barrier section 52 is disposed to prevent material matter or debris (e.g. snow) from entering the volume in front of radar system 36. The barrier 52 also provides impact protection in the event of a vehicle collision. The barrier section 52 is provided from any material which will not absorb a significant amount of water. The barrier section 52 can be provided from any suitable material which is relatively transparent to radar signals propagating therethrough. In one embodiment, the barrier section 52 is provided from a closed cell foam rubber such as Neoprene™. In another embodiment, the barrier section 52 is provided from a polymethacrylimide rigid foam such as Rohacell™. The barrier section 52 can be shaped so as to enclose the radar system 36. The barrier section 52 can be in contact with the radar system 36, or alternatively a space can be provided between the barrier section 52 and the radar system 36.

Disposed adjacent to the barrier section 52 is a spacer section 42. In one embodiment, the spacer section 42 is disposed between the barrier section 52 and the bumper section 40.

In an alternate embodiment, the spacer section 42 can be disposed on an outer surface of the bumper section 40 (i.e. the spacer section can be disposed so that it is visible to a person looking at the outside of an automobile). Though the spacer section 42 can be associated with either surface of the bumper section 40, association with the inner surface as indicated is preferred so that the outer bumper appearance can be unaltered.

In one embodiment, the spacer section 42 can be an extension of the bumper section 40, i.e. molded into the bumper section 40. Alternatively, the spacer section 42 can be provided as a piece distinct from the bumper section 40 that is attached, for example with glue or a fastener structure such as a snap or clamp, to a surface of the bumper section 40, whereby the spacer section 42 is the same type of material as the bumper section 40. Alternatively, the spacer section 42 can be provided from a material which is a different material from that of the bumper section 40. In discussion that follow, however, it will be recognized that in a preferred embodiment the spacer section 42 is provided from a material having the same dielectric constant as that of the bumper section 40. In all cases, the spacer section 42 must be made of a material that, like the bumper section 40, allows radar signal energy to pass through with relatively little attenuation.

The term transmission thickness as used herein will indicate the total thickness of material, at an angle perpendicular to the surface of the material, through which radar energy, represented by perpendicular radar beam 46b, must propagate. The transmission thickness can include either the bumper thickness 48a of the bumper section alone, or, in the alternate embodiment, where the spacer section 42 is provided as a piece distinct from the bumper section 40, the sum of the bumper thickness 48a plus the spacer thickness 48b of the spacer section 42. The transmission thickness 48 will refer to the total.

The term angular transmission thickness as used herein will indicate the total thickness of material, at an angle not perpendicular to the surface of the material, through which radar energy, represented by non-perpendicular radar beams 46a, 46c must propagate.

As above, the angular transmission thickness, for which thickness 50 is one example, can include a distance through both the bumper section 40 and through the spacer section 42 where the spacer section 42 is provided as piece distinct from the bumper section 40.

In addition to radar energy, represented by three radar beams 46a–46c, that propagates outward from the radar system 36, some of the radar energy 46 can reflect back from the bumper section 40, and in the alternative embodiment where the spacer section 42 is provided as piece distinct from the bumper section 40, radar energy 46 can reflect back from the spacer section 42. Hereafter such multiple reflections are collectively called reflection.

It will be recognized by one of ordinary skill in the art that if the dielectric constant along the transmission thickness is a uniform value, and if the transmission thickness is made to be equal to one half of the wavelength of the transmitted radar energy, refection is minimized and the radar energy propagating outward in a direction away from the radar system 36 through the bumper section 40 is maximized. Thus, if the spacer section 42 is composed of a material that has the same dielectric constant as the bumper section 40, the spacer section 42 can be used to provide a transmission thickness that is one half wavelength, where such wavelength is the wavelength in the bumper section 40 and spacer section 42. Alternatively, a transmission thickness corresponding to other multiples one half wavelength can be used with similar effect.

It will also be recognized by one of ordinary skill in the art that in an alternate embodiment, the spacer section 42 can be composed of a material that has a different and dielectric constant than that of the bumper section 40, so as to form a two layer radome, also known as a sandwich radome. In this embodiment, the spacer section 42 is provided to have a spacer thickness 48*b* that is one half wavelength and the bumper section 40 is provided to have a bumper thickness 48*a* that is one half wavelength, where the wavelength is that in the respective material. It should further be recognized that, whereas alternative embodiments shown in subsequent figures indicate spacer sections provided with a dielectric constant equal to that of the respective bumper sections, the two layer radome applies equally well to these embodiments as well.

It is desirable to space the antenna of the radar system 36 relative to the vehicle structure 40, 42 such that the vehicle structure 40, 42 appears in the far field of the antenna radiation pattern.

In one exemplary embodiment, the radar system 36 transmits continuous wave (CW) radar energy that is repetitively swept in frequency from a minimum CW frequency to a maximum CW frequency and the return echo is simultaneously received. At any time, the frequency difference between the transmitting frequency and the receiving frequency of an echo produced by an echoing object represents the distance between the radar antenna and the echoing object.

It should be recognized that where the radar transmitting frequency of radar system 36 changes, as in the exemplary implementation described above, then the corresponding wavelength of the radar energy also changes. Thus, where there is no one particular wavelength, then there is no one particular transmission thickness 48 that would correspond to a multiple of one-half wavelength. In this case, one optimal transmission thickness is chosen, for example a transmission thickness that corresponds to a multiple of one-half wavelength of a frequency which is generally near or in the center of the swept frequency range. The transmission thickness is then optimized at this one transmission frequency.

In one exemplary embodiment, the radar system 36 transmits and receives signals having a frequency in the range of 24.0125 GHz to 24.2375 GHz respectively, as described in the aforementioned patent applications. It will be recognized to one of ordinary skill in the art that, assuming a propagation velocity of $3 \times 10^8$ m/sec, the corresponding maximum and minimum wavelengths in air are 1.249 cm and 1.238 cm respectively.

The dielectric constant of bumper section material, conventionally made of plastic, is approximately 4.0. Whereas the propagation of radar energy through a material is related to the square root of the dielectric constant, the propagation velocity though the bumper section 40 is known to be approximately one half that of propagation in air. Thus, the wavelength in the bumper section 40 is about half that of the wavelengths in air. Thus, the wavelength range is 0.625 cm to 0.619 cm. It will be noticed that the wavelength, when swept in the above range, does not depart greatly from the median of the maximum and minimum wavelengths. The transmission efficiency is enhanced throughout the swept band of frequencies by selecting a single transmission thickness corresponding to one-half of the median of the wavelength range, or 0.361 cm. Alternatively, a transmission thickness that corresponds to one-half of any of the transmitted wavelengths can be used. Use of the spacer section 42 facilitates a design that incorporates a desired transmission spacing.

The exemplary radar system 36 produces multiple transmit and receive beams, where three such beams are designated 46*a*–46*c*. The beams may be electronically scanned in azimuth via the radar system 36. In one embodiment, the exemplary radar system 36 provides seven such transmit and receive beams, each with beamwidths of approximately fifteen degrees, and with a steer angle in azimuth that can cover in excess of one hundred fifty degrees. It will be recognized by one of ordinary skill in the art that other azimuth scan angles, other beam patterns, and other beam widths are possible with this invention.

It should be recognized that for radar energy that propagates though a material at an angular direction, i.e. along the angular transmission thickness such as angular transmission thickness 50, it is desirable to provide an angular transmission thickness that is one half wavelength or a multiple thereof along the angular direction. Because of the wide steer angle in of the exemplary radar system 36, it should be recognized that a constant angular transmission thickness at the angular direction of all beam steering angles in azimuth, though one hundred fifty degrees, is not achieved with a flat bumper section 40 and a flat spacer section 42. It will be recognized that a shaped spacer section 42, that is not flat on its inner surface 54 can provide a more uniform angular transmission thickness throughout the beam steering range. For example, a spacer section 42 having a surface 54 with a semi-spherical or generally rounded shape could be used with the flat bumper section 40. Alternate embodiments to achieve constant angular transmission thickness will be shown in FIGS. 4 and 4A and FIGS. 5 and 5A

It will be recognized by one of ordinary skill in the art, that conventional pulsed and other types of radar systems can also be used with this invention. It will be further recognized by one of ordinary skill in the art that this invention applies to any system that transmits radar energy, and it is not limited to a CW radar system or to a pulsed radar system. It will be further recognized by one of ordinary skill in the art, that this invention can be utilized with a radar system having any number of beams and that transmits and/or receives signals at any frequency. It will be further recognized by one of ordinary skill in the art, that this invention applies to any number of radar systems so mounted to a vehicle.

The position of the radar system 36 on the automobile is selected in accordance with a variety of factors including but not limited to the type and position of an intended detection object, and the overall system with which the radar system is associated. Such systems can include active collision systems, intelligent speed and traffic spacing systems, and passive indication systems. For many such systems, it is desirable to provide one or more radar beams oriented generally forward or rearward of the vehicle. For these systems, the radar system 36 can be mounted behind the front or rear bumper as described. For other such systems, it is desirable to provide radar beams oriented to the side of the vehicle. For side oriented systems, the radar system 36 can be mounted at the corners of the bumper as was indicated in FIG. 1. Alternatively, it may be desirable to mount the radar system 36 behind door or body panels rather than a bumper. The techniques described herein are not limited to mounting of the radar system 36 behind a bumper. Rather, by using a spacer section similar to spacer section 42, on a section of any automobile body part that allows radar energy to pass through, so as to maintain a desired transmission thickness, or more preferably a desired angular transmission thickness, that is a multiple of a half wavelength, transmission efficiency can be optimized.

In one embodiment, the system is attached to the body of an automobile. It will, however, be recognized by one of ordinary skill in the art that the mounting system for radar applies to any vehicle and is not limited to automobiles.

With the radar system 36 mounted behind the automobile bumper or behind some other automobile body part, the original aerodynamics associated with the automobile are maintained, resulting in no loss of fuel economy while maintaining the original aesthetics of the design shape of the automobile.

Referring now to FIG. 3A, it will be recognized that all of the aforementioned techniques can be employed to provide a bumper section 56 having a spacer section 58 thereof removed which acts as the spacer section in the sense that the remaining transmission thickness 60 corresponds to one-half wavelength. Removal material to provide the spacer section 58 can provide not only an optimal transmission thickness but can, in some applications, place the bumper section 56 far enough away from the radar system 36 so that the bumper section 56 is in the far field of the radiating pattern. Also, it should be recognized that the removed spacer section 58 can be shaped to provide a constant angular transmission thickness as similarly described above. The removed spacer section 58 can be associated with either surface of the bumper section 56, though it is shown in association with the inner surface.

Figure 4:
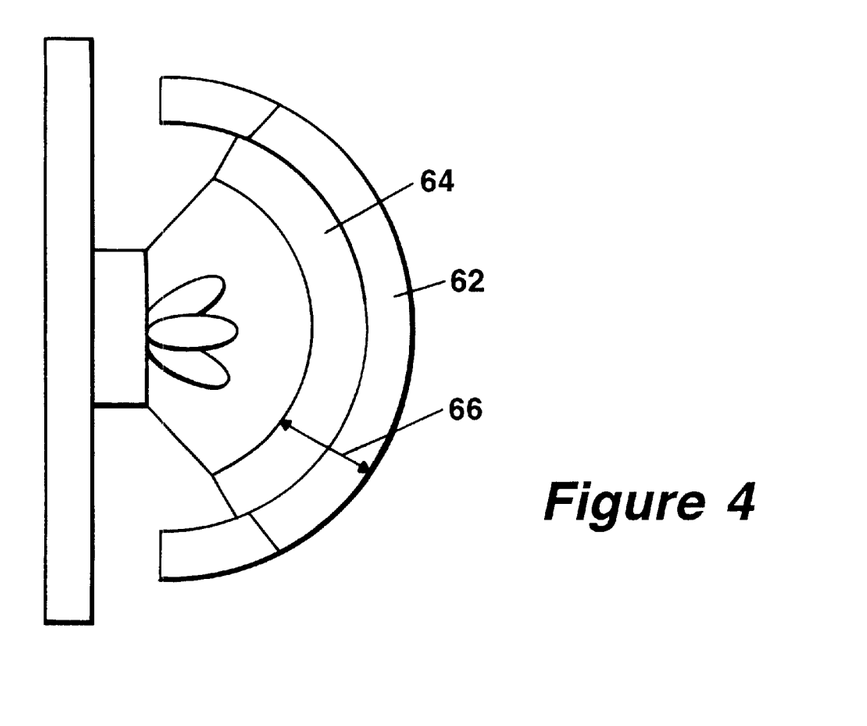
FIG. 4 is a top view of another alternate embodiment of a radar system coupled to the bumper section of a vehicle.

Referring now to FIG. 4 shown from top view, another embodiment is shown that provides a generally uniform angular transmission thickness for all transmission beam angles. In this embodiment, the bumper section 62 is curved and a curved spacer section 64 can be optionally used to provide an angular transmission thickness 66 that is one half wavelength or a multiple thereof. Using curved sections 62, 64, a uniform angular transmission thickness, for example thickness 66, is achieved throughout the range of beam steer angles. Thus, transmission efficiency can be achieved throughout the range.

Figure 4A:
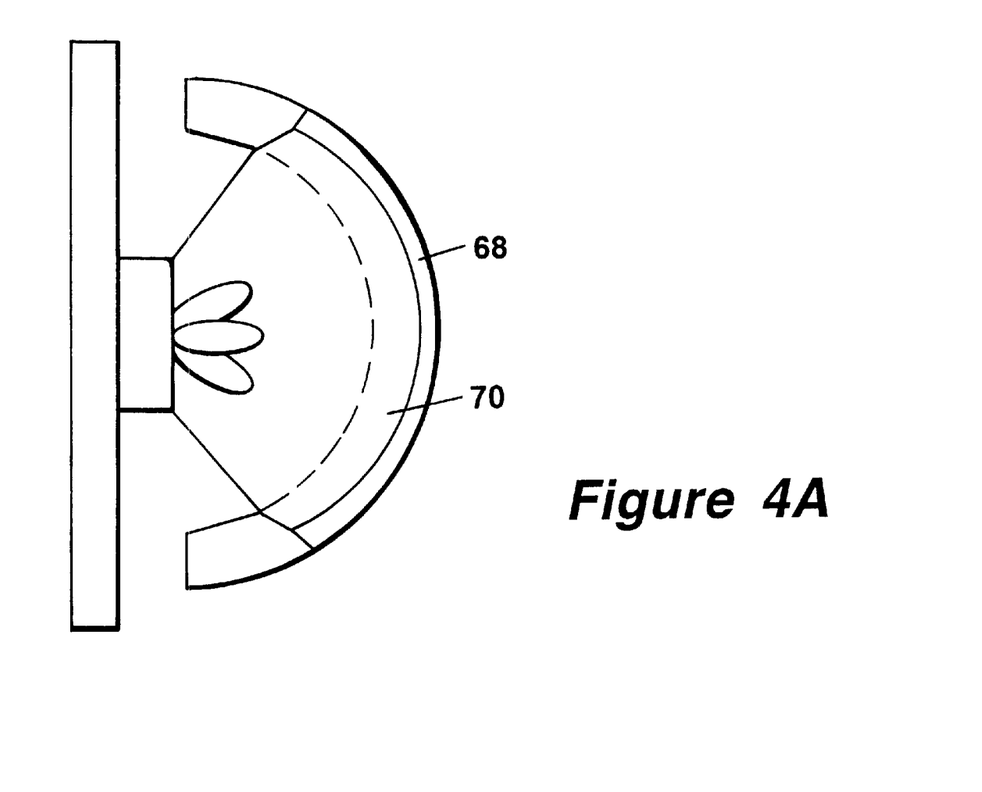
FIG. 4A is a top view of yet another alternate embodiment of a radar system coupled to the bumper section of a vehicle.

Referring now to FIG. 4A shown also from top view, this embodiment can be compared to that of FIG. 3A, The bumper section 68 incorporates a spacer section 70, that is formed by the removal of material rather than addition of material. Again, using a curved bumper section 68, a uniform angular transmission thickness can be achieved throughout the beam steer angle range.

Referring now to FIG. 5 again shown from top view, in some applications it may be desirable or necessary to use a spacer section 72 having one curved surface 72a and one non-curved surface 72b. The shapes of the two surfaces can be selected to match or conform to physical structure of the bumper section 74 while improving performance of the radar system. By selection of the curvature of the curved surface 72a, the spacer section 72 can provide a uniform angular transmission thickness 76 over the range of beam steer angles.

Figure 5:
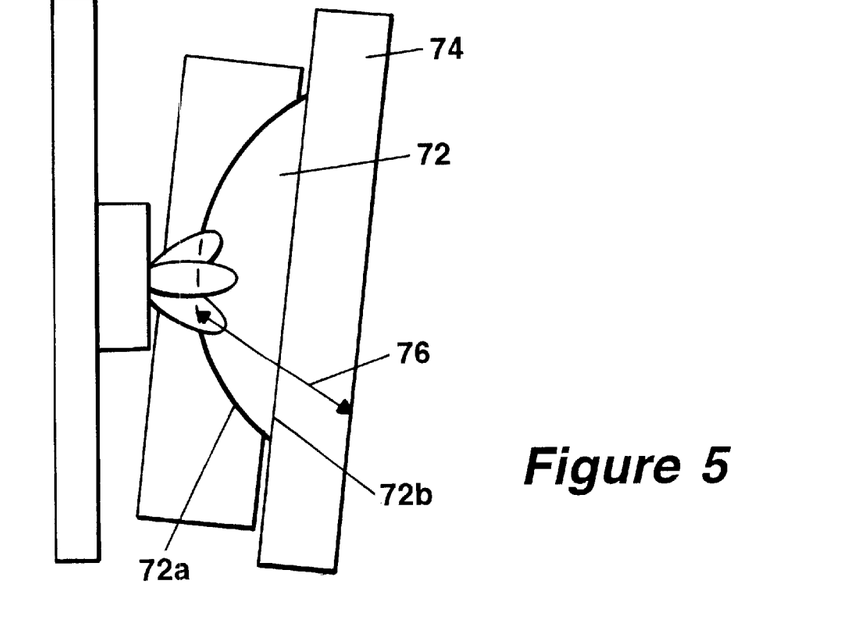
FIG. 5 is a top view of yet another alternate embodiment of a radar system coupled to the bumper section of a vehicle.
Figure 5A:
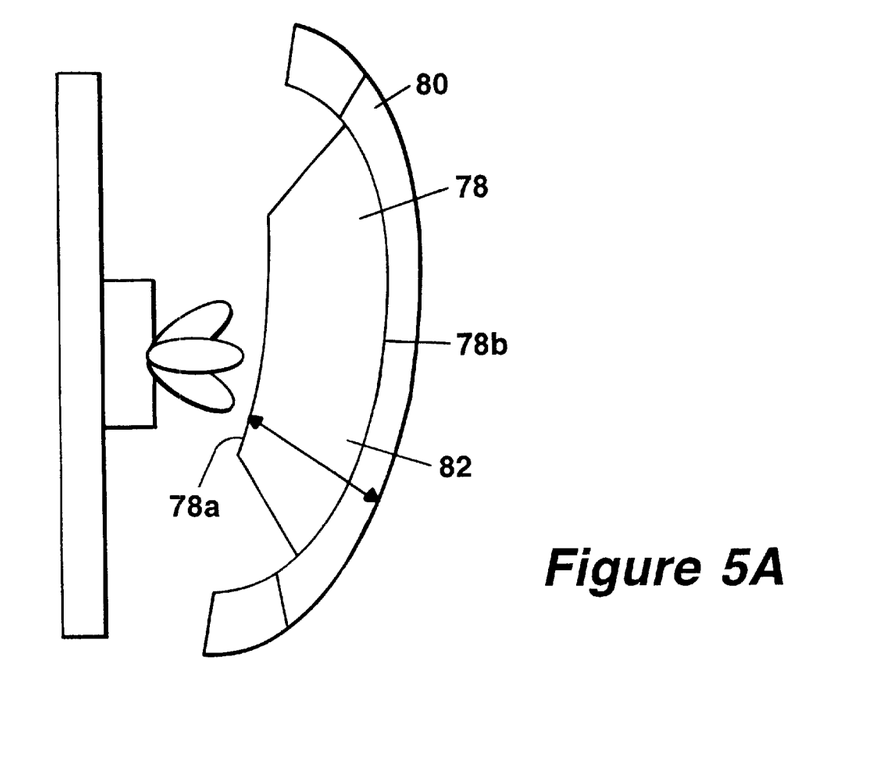
FIG. 5A is a top view of yet another alternate embodiment of a radar system coupled to the bumper section of a vehicle.

Referring now to FIG. 5A again shown from top view, in some applications it may be desirable or necessary to use a spacer section 78 having two curved surfaces 78a, 78b. As shown in FIG. 5A, the spacer section 78 can be disposed on a curved surface of the bumper section 80. As above, by selection of the curvature of the curved surfaces 78a, 78b the spacer section 78 can provide a uniform angular transmission thickness 82 over the range of beam steer angles. It is also possible to provide the spacer section 78 having a shape which can accommodate an irregularly shaped bumper section or vehicle structure.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A mounting system for mounting a radar system to a vehicle, the mounting system comprising:
   a spacer section disposed between a first surface of the radar system and a first surface of the vehicle, said spacer section having a transmission thickness and an angular transmission thickness associated with the vehicle structure that increases the transmission efficiency of the radar energy from the radar system through the vehicle structure.

2. The mounting system of claim 1, wherein the transmission thickness is one half of the wavelength.

3. The mounting system of claim 1, wherein the transmission thickness is a multiple of one half of the wavelength.

4. The mounting system of claim 1, wherein the angular transmission thickness is one half of the wavelength at an angle along the beam steer angle.

5. The mounting system of claim 1, wherein angular transmission thickness is a multiple of one half of the wavelength at an angle along the beam steer angle.

6. The mounting system of claim 1, wherein the spacer section is added to a surface of the non-metallic vehicle structure.

7. The mounting system of claim 1, wherein the spacer section is removed from a surface of the non-metallic vehicle structure.

8. The mounting system of claim 1, further comprising a protective barrier section between the radar transceiver and the surface of the non-metallic vehicle structure.

9. The mounting system of claim 1, wherein the vehicle is an automobile.

10. The mounting system of claim 1, wherein the vehicle structure is an automobile bumper.

* * * * *

UNITED STATES PATENT AND TRADEMARK OFFICE
CERTIFICATE OF CORRECTION

PATENT NO. : 6,489,927 B2
DATED : December 3, 2002
INVENTOR(S) : LeBlanc et al.

It is certified that error appears in the above-identified patent and that said Letters Patent is hereby corrected as shown below:

Column 4,
Line 55, delete "refection is" and replace with -- reflection is --.

Column 5,
Line 53, delete "though the bumper" and replace with -- through the bumper --.

Column 6,
Line 13, delete "though a material" and replace with -- through a material --.
Line 18, delete "angle in of the" and replace with -- angle of the --.
Line 21, delete "though one hundred" and replace with -- through one hundred --.

Signed and Sealed this

Twentieth Day of May, 2003

JAMES E. ROGAN
*Director of the United States Patent and Trademark Office*